May 1, 1923.  1,454,018
J. LEES
LAWN EDGE TRIMMER
Filed May 12, 1920
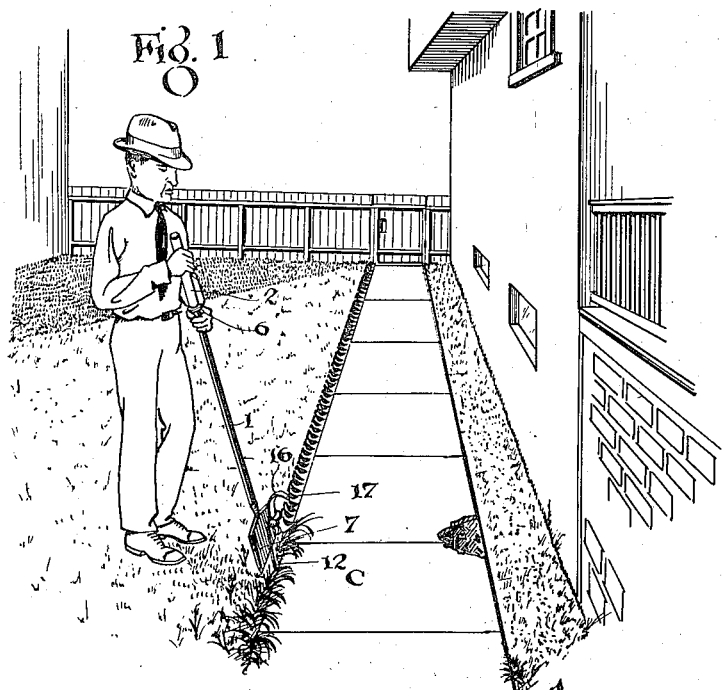
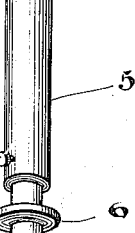
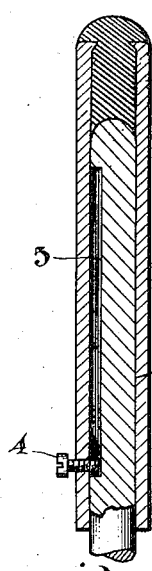
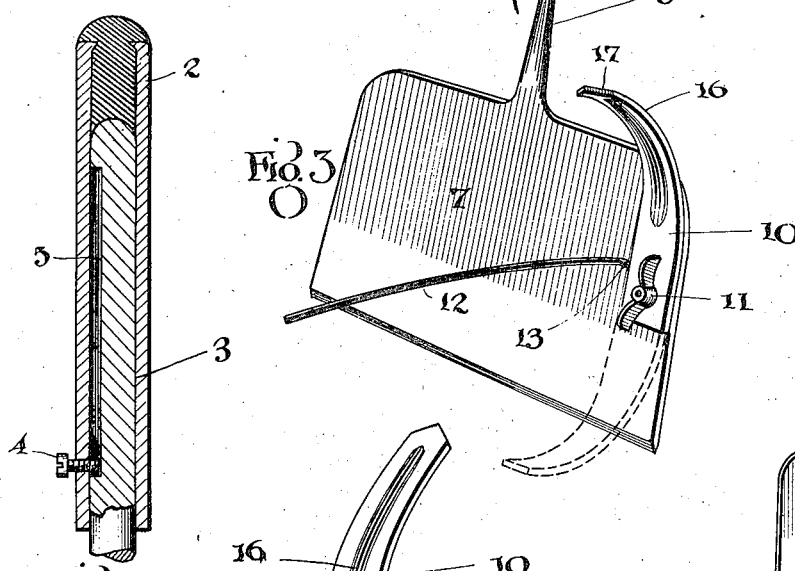
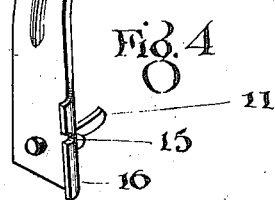
INVENTOR
Joseph Lees.
BY
ATTORNEYS Patented May 1, 1923.

1,454,018

UNITED STATES PATENT OFFICE.

JOSEPH LEES, OF ALLENTOWN, PENNSYLVANIA.

LAWN-EDGE TRIMMER.

Application filed May 12, 1920. Serial No. 380,809.

*To all whom it may concern:*

Be it known that I, JOSEPH LEES, a citizen of the United States, and a resident of Allentown, Lehigh County, and State of Pennsylvania, have made certain new and useful Improvements in Lawn-Edge Trimmers, of which the following is a specification.

My invention relates to improvements in lawn edge trimmers, it being more particularly an improvement on the lawn edge trimmer disclosed in my co-pending application filed Nov. 15, 1919, Serial No. 338,180, and it consists in the constructions, combinations and arrangements herein described and claimed.

One of the foremost objects of the invention is to provide a cutting implement for edging that portion of a lawn at the sides of a cement or other sidewalk, a turf remover and cutting gauge being included as important elements of the implement.

A further object of the invention is to provide a cutting implement for the purpose described, in which the cutting gauge is adjustable by merely bending it to various distances from the blade so that different widths of turf can be removed from along the edge of the walk accordingly as may be desired.

A further object of the invention is to provide an improved impacting member on the upper end of the handle, by means of which the cutting blade is driven through the turf.

Another object of the invention is to provide a cutting implement for removing the long projecting grass along the edge of a walk, which the lawn mower fails to reach.

Other objects and advantages will appear in the following specification, reference being had to the accompanying drawings, in which:—

Figure 1 is a perspective view illustrating the improved lawn edge trimmer in operation, Figure 2 is a perspective view of the whole implement, Figure 3 is a detail perspective view of the cutting blade, viewed from another position, Figure 4 is a detail perspective view of the turf remover, and Figure 5 is a detail section of the upper part of the handle, taken substantially on the line 5—5 of Figure 2.

In carrying out the invention I provide a staff 1, on the upper end of which the weighted impacting member 2 operates. This member is made substantially as suggested in Figure 5, wherein it is shown to have a bore 3 into which the upper end of the staff 1 fits.

The bore 3 may be cast or drilled into the impacting member as far as desired, so as to leave more or less solid metal at the upper end to adjust the weight thereof. But the preferred manner of constructing the impacting member is to fill the upper end of a piece of pipe with lead, rounding off both the outside and inside so as to produce the inner concavity and the upper rounded end. The inner concavity in striking the upper rounded end of the handle, prevents the destruction thereof which might otherwise result. In order to prevent the impacting member from being pulled off of the end of the staff 1 in drawing it upwardly in preparation of making a stroke, a set screw 4 with the end working in a longitudinal groove 5 in the staff, may be employed.

It is to be understood however, that the set screw and groove are found in a few cases to be essential. A person using the implement a few times will soon become accustomed to it and will be able to so adjust the strokes that the complete pulling off of the impacting member will never occur. As a precaution against striking the hand which holds the staff 1 close to the lower end of the impacting member, a hand guard 6 is fitted near the upper end as shown in Figures 1 and 2.

This hand guard is in the shape of a rubber washer, but may be made of any suitable material. It is also to be understood that the provision of this hand guard is only essential in a few cases wherein handles are found to be machined too small, because the operator will soon learn to grip the staff at the proper place so as to avoid the pinching of his hand should it be struck by the impacting member.

Attention is now directed to the cutting blade 7. This is made preferably of steel and includes the tang 8 which is driven into the staff 1 and retained by the ferrule 9. Located either centrally or at one side of the blade is the turf remover 10.

Instead of removing the turf as shown in the drawing, the cutter may be drawn alongside of the walk with the side of the blade sliding along the edge of the walk, thereby trimming the grass and sharpening the cutting edge.

Normally this turf remover stands in the position indicated in Figures 2 and 3. It is held in this position by the thumb screw 11, which thumb screw also retains the gauge wire or pointer 12, which is made of some resilient and bendable material. The distance at which the cutting blade 7 is set from the edge of the cement walk C is gauged by the wire 12, the end of the wire then pointing along the edge of the walk, helping the operator in placing the cutting blade.

The innermost slightly flat and curved end 13 of the gauge wire 12 is bound in place beneath the turf remover 10 by means of the thumb screw 11 which, as is obvious, serves the double purpose of holding both members in place. One edge 14 of the turf remover is slightly bent over and recessed at 15 so as to provide a gripping place for the gauge wire.

The operation will at once be apparent to the reader, but a brief review may be of advantage. Consider Figure 1. The operator works along the edge of the walk C, placing the cutting blade 7 at such distance from the edge of the walk on the grass as may be indicated by the gauge wire 12. When the cutting blade 7 is set upon the grass at the proper place, the impacting member 2 is given one or two firm strokes, thereby driving the blade into the ground a sufficient distance to either immediately enable the removal of that portion of the turf between the blade and the edge of the walk, or to enable its subsequent removal by means of the member 10.

Greater or lesser portions of turf may be removed by bending the gauge wire 12 out or in according to particular desires. In case the turf remover is employed, the thumb screw 11 is slightly unloosened, and the turf remover is given a half turn toward the left so that it extends downwardly and outwardly as suggested in dotted lines in Figure 3. The turf remover then resembles a hook which is employed for the purpose of lifting the cut portions of the turf from the trough adjacent the edge of the sidewalk, and throwing it onto the sidewalk, from whence it is subsequently removed.

Figure 1 illustrates the cut portions of the turf as having been removed from along the edge of the walk as the cutting operation proceeds. But obviously the cutting may be done first and the removal be accomplished afterwards by means of the remover 10. In this connection it is to be seen that the end of the remover is convexed at 16 to add strength thereto, and sharpened at the point 17 so as to facilitate getting beneath the cut turf.

It is desired to point out that among the many uses to which the improved lawn edge trimmer can be put are those of a walk scraper, both for expeditiously removing ice and accumulations of dirt, as a cutter of circles around shrubbery, trees, etc.

While the construction and arrangement of the improved lawn edge trimmer as herein described and claimed, is that of a generally preferred form, obviously modifications and changes can be made without departing from the spirit of the invention or the scope of the claims.

I claim:—

1. A lawn edge trimmer, including a blade, a distance-gauging pointer of material which is bendable to enable distance adjustment, and turf-removing means, including a portion applied to the pointer, and means by which both the pointer and turf remover are held in place on the blade.

2. A lawn edge trimmer comprising a blade, a distance-gauging pointer which is bendable to indicate various distances from the blade, a turf remover, with a bent and recessed portion carried on the face of the blade, and means for clamping the remover in any position and the pointer in the recess of said portion.

3. A lawn edge trimmer including a blade, a distance-gauging pointer of wire which is bendable to enable distance adjustment, and turf removing means including a portion gripping the pointer and common means by which both the pointer and turf remover are held in place on the blade.

JOSEPH LEES.